United States Patent
Larson et al.

(10) Patent No.: US 9,977,659 B2
(45) Date of Patent: May 22, 2018

(54) MANAGING DATA SET OBJECTS

(75) Inventors: Brond Larson, Sharon, MA (US);
Richard A. Shapiro, Arlington, MA (US); Craig W. Stanfill, Lincoln, MA (US); Adam Harris Weiss, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 433 days.

(21) Appl. No.: 13/281,039

(22) Filed: Oct. 25, 2011

(65) Prior Publication Data

US 2012/0102029 A1    Apr. 26, 2012

Related U.S. Application Data (60) Provisional application No. 61/406,438, filed on Oct. 25, 2010.

(51) Int. Cl.
*G06F 17/30*    (2006.01)
*G06F 9/44*    (2018.01)

(52) U.S. Cl.
CPC ..................... *G06F 8/34* (2013.01)

(58) Field of Classification Search
CPC ........................................................ G06F 8/34
USPC ................................................. 707/609, 736
See application file for complete search history.

(56) References Cited

U.S. PATENT DOCUMENTS

| | | | |
|---|---|---|---|
| 5,630,127 A | 5/1997 | Moore | |
| 5,758,351 A | 5/1998 | Gibson et al. | |
| 5,966,072 A | 10/1999 | Stanfill et al. | |
| 6,088,702 A | 7/2000 | Plantz | |
| 6,494,159 B2 | 12/2002 | Sirmalis et al. | |
| 6,708,186 B1 | 3/2004 | Claborn et al. | |
| 6,948,154 B1 | 9/2005 | Rothermel et al. | |
| 7,080,088 B1 | 7/2006 | Lau | |
| 7,110,924 B2 | 9/2006 | Prewett et al. | |
| 7,164,422 B1 | 1/2007 | Wholey, III et al. | |
| 7,167,850 B2 | 1/2007 | Stanfill | |

(Continued)

FOREIGN PATENT DOCUMENTS

| | | |
|---|---|---|
| EP | 2221733 | 8/2010 |
| JP | 11-143755 A | 5/1999 |
| JP | 2006-277624 | 10/2006 |

OTHER PUBLICATIONS

International Search Report & Written Opinion issued in PCT application No. PCT/US2012/021286, dated May 4, 2012, 15 pages.

(Continued)

*Primary Examiner* — Syling Yen
*Assistant Examiner* — Navneet Gmahl
(74) *Attorney, Agent, or Firm* — Wolf, Greenfield & Sacks, P.C.

(57) ABSTRACT

Managing data set objects for graph-based data processing includes: storing a group of one or more data set objects in a data storage system, the data set objects each representing a respective data set; and generating an association between at least a first data set object in the group and at least a first node of a dataflow graph for processing data in a data processing system, the first node representing a source or sink of data in a flow of data represented by a link in the dataflow graph, and the first data set object including a plurality of modes in which different transformational logic is applied to data processed by the first node.

23 Claims, 8 Drawing Sheets

(56) References Cited

U.S. PATENT DOCUMENTS

| | | | |
|---|---|---|---|
| 7,661,067 B2 | 2/2010 | Chen et al. | |
| 7,689,565 B1 | 3/2010 | Gandhi et al. | |
| 7,716,630 B2* | 5/2010 | Wholey et al. | 717/100 |
| 7,765,529 B1 | 7/2010 | Singh et al. | |
| 7,840,949 B2 | 11/2010 | Schumacher et al. | |
| 7,853,553 B2 | 12/2010 | Lankinen et al. | |
| 7,890,509 B1 | 2/2011 | Pearcy et al. | |
| 7,895,586 B2 | 2/2011 | Ozone | |
| 7,979,646 B2* | 7/2011 | Furtek et al. | 711/149 |
| 8,069,129 B2 | 11/2011 | Gould et al. | |
| 8,423,564 B1 | 4/2013 | Hayes | |
| 8,516,008 B1 | 4/2013 | Marquardt et al. | |
| 8,484,159 B2* | 7/2013 | Stanfill et al. | 707/609 |
| 2001/0007959 A1 | 7/2001 | Abdalla | |
| 2001/0014890 A1 | 8/2001 | Liu et al. | |
| 2002/0161799 A1 | 10/2002 | Maguire, III et al. | |
| 2002/0194196 A1 | 12/2002 | Weinberg et al. | |
| 2002/0194314 A1 | 12/2002 | Kouznetsov et al. | |
| 2003/0016246 A1 | 1/2003 | Singh | |
| 2003/0041063 A1 | 2/2003 | Brady | |
| 2003/0154191 A1 | 8/2003 | Fish et al. | |
| 2003/0163441 A1 | 8/2003 | Godfredsen et al. | |
| 2003/0163597 A1 | 8/2003 | Hellman et al. | |
| 2004/0015783 A1 | 1/2004 | Lennon et al. | |
| 2004/0024740 A1 | 2/2004 | McGeorge, Jr. | |
| 2004/0056908 A1 | 3/2004 | Bjornson et al. | |
| 2004/0088318 A1 | 5/2004 | Brady | |
| 2004/0225632 A1* | 11/2004 | Benson | G06F 17/30575 |
| 2004/0225682 A1 | 11/2004 | Murman et al. | |
| 2004/0239681 A1 | 12/2004 | Robotham et al. | |
| 2005/0010896 A1* | 1/2005 | Meliksetian | G06F 17/30917 717/106 |
| 2005/0060313 A1 | 3/2005 | Naimat et al. | |
| 2005/0060317 A1 | 3/2005 | Lott et al. | |
| 2005/0097561 A1 | 5/2005 | Schumacher | |
| 2005/0114369 A1 | 5/2005 | Gould et al. | |
| 2005/0178833 A1 | 8/2005 | Kisliakov | |
| 2005/0187984 A1 | 8/2005 | Chen | |
| 2005/0234762 A1 | 10/2005 | Pinto et al. | |
| 2005/0262121 A1 | 11/2005 | Cesare et al. | |
| 2005/0289167 A1* | 12/2005 | Haselden | G06F 8/24 |
| 2006/0007464 A1 | 1/2006 | Percey | |
| 2006/0020570 A1 | 1/2006 | Wu | |
| 2006/0095466 A1 | 5/2006 | Stevens et al. | |
| 2006/0200739 A1 | 9/2006 | Bhatia et al. | |
| 2006/0282480 A1 | 12/2006 | Johnson et al. | |
| 2007/0011208 A1 | 1/2007 | Smith | |
| 2007/0011668 A1* | 1/2007 | Wholey et al. | 717/151 |
| 2007/0027858 A1 | 2/2007 | Weinberg et al. | |
| 2007/0050750 A1 | 3/2007 | Bykov et al. | |
| 2007/0094060 A1 | 4/2007 | Apps et al. | |
| 2007/0136692 A1 | 6/2007 | Seymour et al. | |
| 2007/0179956 A1 | 8/2007 | Whitmyer, Jr. | |
| 2007/0198457 A1 | 8/2007 | Olenick et al. | |
| 2007/0220022 A1 | 9/2007 | Lankinen | |
| 2007/0226203 A1 | 9/2007 | Adya et al. | |
| 2007/0239751 A1 | 10/2007 | Wei et al. | |
| 2007/0271381 A1 | 11/2007 | Wholey et al. | |
| 2007/0276787 A1 | 11/2007 | Piedmonte | |
| 2007/0294119 A1 | 12/2007 | Eicher et al. | |
| 2008/0049022 A1 | 2/2008 | Sherb et al. | |
| 2008/0126988 A1 | 5/2008 | Mudaliar | |
| 2008/0162384 A1 | 7/2008 | Kleist et al. | |
| 2008/0201359 A1* | 8/2008 | Warshavsky | G06F 17/30569 |
| 2008/0228697 A1 | 9/2008 | Ayda et al. | |
| 2008/0243772 A1 | 10/2008 | Fuxman et al. | |
| 2008/0243891 A1 | 10/2008 | Super et al. | |
| 2008/0256014 A1* | 10/2008 | Gould et al. | 706/48 |
| 2008/0312979 A1 | 12/2008 | Lee et al. | |
| 2008/0313204 A1 | 12/2008 | Schultz et al. | |
| 2009/0036749 A1 | 2/2009 | Freiburger et al. | |
| 2009/0037488 A1 | 2/2009 | Abrams | |
| 2009/0063515 A1* | 3/2009 | Bar-Or | G06F 8/433 |
| 2009/0083313 A1 | 3/2009 | Stanfill et al. | |
| 2009/0094291 A1 | 4/2009 | Yalamanchi | |
| 2009/0234623 A1 | 9/2009 | Germain et al. | |
| 2009/0319494 A1 | 12/2009 | Gooder | |
| 2009/0327196 A1 | 12/2009 | Studer et al. | |
| 2010/0100220 A1 | 4/2010 | Belanger et al. | |
| 2010/0114833 A1 | 5/2010 | Mu | |
| 2010/0121890 A1 | 5/2010 | Perkins et al. | |
| 2010/0138388 A1 | 6/2010 | Wakeling et al. | |
| 2010/0145914 A1 | 6/2010 | Kanno et al. | |
| 2010/0198769 A1 | 8/2010 | Gould et al. | |
| 2010/0223218 A1 | 9/2010 | Prendergast | |
| 2011/0061057 A1* | 3/2011 | Harris et al. | 718/104 |
| 2011/0066602 A1 | 3/2011 | Studer et al. | |
| 2011/0145297 A1 | 6/2011 | Singh | |
| 2011/0276789 A1* | 11/2011 | Chambers | G06F 9/445 712/220 |
| 2011/0295863 A1 | 12/2011 | Weir et al. | |
| 2012/0054164 A1 | 3/2012 | Falkebo et al. | |
| 2012/0158625 A1 | 6/2012 | Nelke et al. | |
| 2012/0167112 A1* | 6/2012 | Harris et al. | 718/104 |
| 2012/0185449 A1 | 7/2012 | Gould et al. | |
| 2012/0310905 A1 | 12/2012 | Hans et al. | |
| 2013/0166515 A1 | 6/2013 | Kung et al. | |
| 2014/0108357 A1 | 4/2014 | Procops et al. | |

OTHER PUBLICATIONS

Transaction History, U.S. Appl. No. 12/628,521.
Transaction History, U.S. Appl. No. 12/883,721.
Transaction History, U.S. Appl. No. 13/350,191.
International Search Report & Written Opinion issued in PCT application No. PCT/US09/66210, dated Jan. 27, 2010, 8 pages.
International Search Report & Written Opinion issued in PCT application No. PCT/US10/49142, dated Nov. 5, 2010, 11 pages.
Van Megen, Rudolf et al., "Costs and benefits of early defect detection: experiences from developing client server and host applications." Software Quality Journal 4, 247-256 (1995).
International Search Report & Written Opinion issued in PCT application No. PCT/US2011/057623, dated Jan. 25, 2012, 13 pages.
Melia, Mark et al., "Constraint-Based Validation of Adaptive e-Learning Courseware," IEEE Transactions on Learning Technologies, vol. 2, No. 1, Jan.-Mar. 2009, pp. 37-49.
Rull, Guillem et al., "MVT: A Schema Mapping Validation Tool," EDBT'09, Mar. 24-26, 2009, pp. 1120-1123.
Harkins, Susan "Use Excel's Conditional Formatting to Find Errors" *TechRepublic*, pp. 1-3, Feb. 16, 2008: http://www.techrepublic.com/blog/microsoft-office/use-excels-conditional-formatting-to-find-errors/.
International Search Report & Written Opinion issued in PCT application No. PCT/US2013/064979, dated Nov. 28, 2013, 11 pages.
Liskin, Miriam "Microsoft Access 97 for Windows SuperGuide" *Ziff-Davis Press*, Jan. 1, 1997, ch. 4 & 15, pp. 117-157 and 687-739.
Chaiken et al., "Scope: easy and efficient parallel processing of massive data sets," J. Proc. Of the VLDB Endowment VLDB Endowment Hompagearchive, vol. 1, No. 2, (2008), pp. 1265-1276.
Pinheiro et al., "Mobile agents for aggregation of network management data," Published in Agent Systems and Applications, (1999) and Third International Symposium on Mobile Agents, Proceedings, First International Symposium, 1999, pp. 130-40.
Japanese Office Action issued in JP2012-529903, dated Aug. 7, 2014, 4 pages (English Translation).
U.S. Appl. No. 12/628,521, filed Dec. 1, 2009, Mapping Instances of a Dataset within a Data Management System.
U.S. Appl. No. 12/883,721, filed Sep. 16, 2010, Mapping Dataset Elements.
U.S. Appl. No. 13/350,191, filed Jan. 13, 2012, Managing Changes to Collections of Data.
U.S. Appl. No. 13/653,995, filed Oct. 17, 2012, Specifying and Applying Rules to Data.
Notice of Reasons for Rejection, Japanese Application No. 2011-539631, dated Oct. 28, 2013 (3 pages).
International Search Report and Written Opinion issued in PCT/US2015/049131, dated Nov. 26, 2015, 14 pages.

(56) References Cited

OTHER PUBLICATIONS

Canadian Examination Search Report for Application No. CA 2,744,881 dated Aug. 5, 2016.
Canadian Examination Search Report for Application No. CA 2,814,835 dated May 23, 2017.
Chinese Office Action for Application No. CN 201180051291.1 dated May 31, 2016.
European Search Report for Application No. EP 10817836.9 dated Aug. 19, 2016.
Japanese Office Action (English Translation) for Application No. JP 2015-165472 dated Jul. 11, 2016.
Japanese Office Action (English Translation) for Application No. JP 2012-529903 dated Jul. 15, 2016.
Korean Office Action for Application No. 10-2013-7010459 dated Sep. 20, 2017.

* cited by examiner

MANAGING DATA SET OBJECTS

CROSS-REFERENCE TO RELATED APPLICATIONS

This application claims priority to U.S. application Ser. No. 61/406,438, filed on Oct. 25, 2010, incorporated herein by reference.

BACKGROUND

This description relates to managing data set objects.

Dataflow graphs process data. Dataflow graphs include data sources, data sinks, and components. Data sources, data sinks, and components are connected by connections that enable data to flow from one component to another, or from data sources to components, or from components to data sinks. Dataflow graphs can be represented visually by a directed graph having nodes (also called vertices) representing data sources, data sinks, and components connected by links (also called arcs) representing the connections.

SUMMARY

In one aspect, in general, a method for managing data set objects for graph-based data processing includes: storing a group of one or more data set objects in a data storage system, the data set objects each representing a respective data set; and generating an association between at least a first data set object in the group and at least a first node of a dataflow graph for processing data in a data processing system, the first node representing a source or sink of data in a flow of data represented by a link in the dataflow graph, and the first data set object including a plurality of modes in which different transformational logic is applied to data processed by the first node.

Aspects may include one or more of the following features.

Generating the association between the associated data set object and the associated node includes: accessing data structures corresponding to the dataflow graph, the dataflow graph including a plurality of nodes, including the first node, and links connecting the nodes, the links representing flows of data between the nodes; receiving a selection of the first data set object from the group based on user input, the first data set object including a plurality of modes, each mode including transformational logic and at least one of an input port or an output port; receiving a selection of a mode for the first data set object based on user input; generating the first node in the dataflow graph after receiving the selected mode, the first node including the transformational logic, any input ports, and any output ports of the selected mode; and connecting the first node to at least one node in the dataflow graph using a link.

The first data set object further includes at least one parameter and the first node further includes a value for the parameter.

The transformational logic of a first mode of the plurality of modes includes transformational logic that reads data records from a data store.

The transformational logic of a second mode of the plurality of modes includes transformation logic that writes data records to the data store.

The first node includes information that identifies the first data set object.

The method may further include: receiving a selection of the first data set object from the group based on user input; and identifying a plurality of dataflow graphs, each of the dataflow graphs including a node that identifies the first data set object.

Each mode of the data set object is represented by a distinct dataflow graph including nodes and links connecting the nodes, the links representing flows of data between the nodes.

Generating the association between the associated data set object and the associated node includes: accessing data structures corresponding to a plurality of dataflow graphs, including the dataflow graph that includes the first node, each dataflow graph including a plurality of nodes and links connecting the nodes, the nodes including transformational logic and the links representing flows of data between the nodes; identifying a plurality of nodes of the plurality of dataflow graphs that access the same data store, at least one identified node including one or more parameters; generating a data set object including: identifying a plurality of modes for the generated data set object based on the transformational logic of the identified nodes, and identifying parameters for the generated data object based on parameters associated with the identified nodes; and storing the generated data set object in the group.

The method may further include updating each of the plurality of nodes to access the data store based on information that identifies the generated data set object.

Identifying a plurality of nodes of the plurality of dataflow graphs that access the same data store includes: executing each of the plurality of dataflow graphs; recording parameter values assigned to parameters of the nodes of the plurality of dataflow graphs during the execution of the dataflow graphs; and identifying the plurality of nodes based on the recorded parameter values.

In another aspect, in general, a computer-readable storage medium stores a computer program for managing data set objects for graph-based data processing. The computer program includes instructions for causing a computing system to: store a group of one or more data set objects in a data storage system, the data set objects each representing a respective data set; and generate an association between at least a first data set object in the group and at least a first node of a dataflow graph for processing data in a data processing system, the first node representing a source or sink of data in a flow of data represented by a link in the dataflow graph, and the first data set object including a plurality of modes in which different transformational logic is applied to data processed by the first node.

In another aspect, in general, a computing system for managing data set objects for graph-based data processing. The computing system includes: a data storage system storing a group of one or more data set objects, the data set objects each representing a respective data set; and at least one processor coupled to the data storage system configured to generate an association between at least a first data set object in the group and at least a first node of a dataflow graph for processing data in a data processing system, the first node representing a source or sink of data in a flow of data represented by a link in the dataflow graph, and the first data set object including a plurality of modes in which different transformational logic is applied to data processed by the first node.

In another aspect, in general, a computing system for managing data set objects for graph-based data processing. The computing system includes: means for storing a group of one or more data set objects, the data set objects each representing a respective data set; and means for generating an association between at least a first data set object in the group and at least a first node of a dataflow graph for processing data in a data processing system, the first node representing a source or sink of data in a flow of data represented by a link in the dataflow graph, and the first data set object including a plurality of modes in which different transformational logic is applied to data processed by the first node.

Aspects can include one or more of the following advantages. Data set objects may be reused in multiple dataflow graphs. Updating data records may be simplified. Data dependencies may be determined. Application development may be simplified.

Other features and advantages of the invention will become apparent from the following description, and from the claims.

DESCRIPTION

Figure 1:
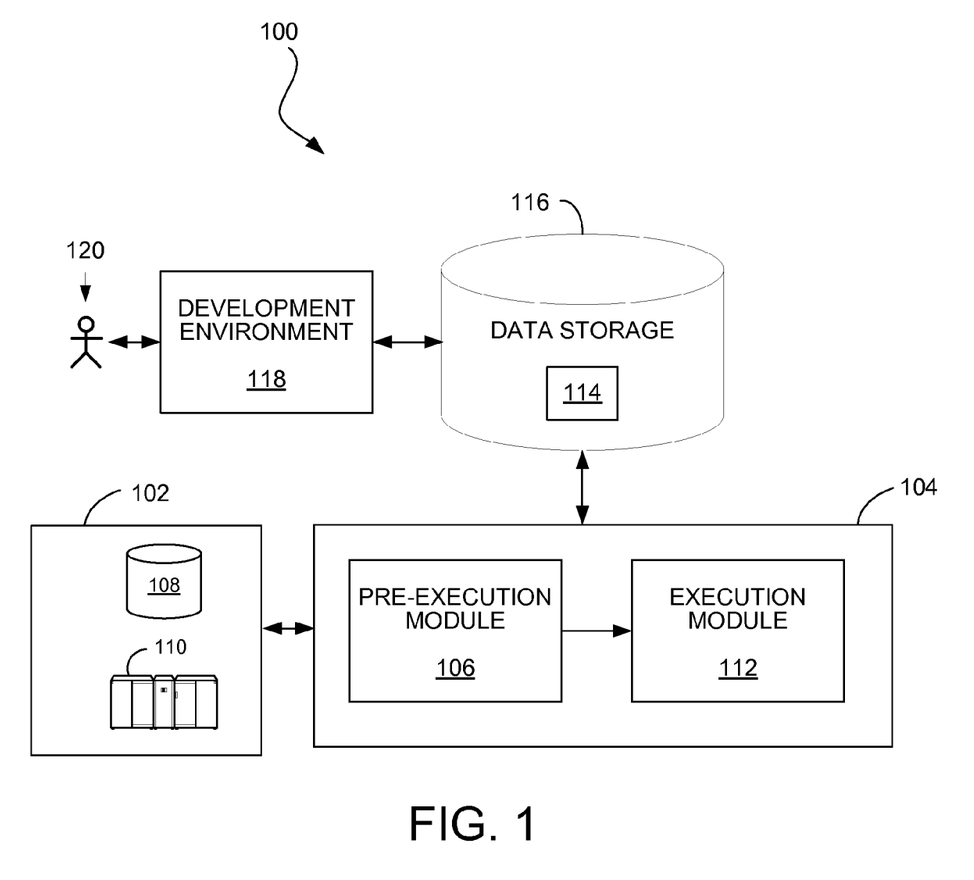
FIG. 1 shows an exemplary data processing system 100 in which data set object techniques can be used.

FIG. 1 shows an exemplary data processing system 100 in which the data set object techniques can be used. The system 100 includes a data source 102 that may include one or more sources of data such as storage devices or connections to online data streams, each of which may store data in any of a variety of storage formats (e.g., database tables, spreadsheet files, flat text files, or a native format used by a mainframe). An execution environment 104 includes a pre-execution module 106 and an execution module 112. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via a local area network (LAN) and/or wide-area network (WAN)), or any combination thereof.

The pre-execution module 106 is configured to perform various tasks in preparation for executing dataflow graphs and other executable programs such as compiling dataflow graphs, storing/loading compiled dataflow graphs to/from a data storage system 116 accessible to the execution environment 104, or other tasks associated with managing dataflow graphs. The execution module 112 reads data from the data source 102 and processes the data using executable programs including programs expressed in the form of a dataflow graph.

Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104, over a remote connection.

The execution module 112 uses a catalog 114 of data set objects stored in a data storage system 116 accessible to the execution environment 104 for executing dataflow graphs. The catalog 114 is managed by the pre-processing module 106 to provide data set objects that can be configured in different modes, as described in more detail below. The catalog may store a group of dataset objects in a data structure or a particular location (e.g. a file system directory), or may include information that identifies a group of data objects stored in a variety of locations. In some implementations, the catalog includes information such as an index or metadata to enable searching or other operations. The data storage system 116 is also accessible to a development environment 118 in which a developer 120 is able to develop dataflow graphs and interact with the catalog 114.

The development environment 118 is, in some implementations, a system for developing applications as dataflow graphs that include vertices (representing components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference. A system for executing such graph-based computations is described in U.S. Pat. No. 5,566,072, EXECUTING COMPUTATIONS EXPRESSED AS GRAPHS, incorporated herein by reference. Dataflow graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

The execution module 112 can receive data from a variety of types of systems including different forms of database systems. The data may be organized as records having values for respective fields (also called "attributes" or "columns"), including possibly null values. When first reading data from a data source, the execution module 112 typically starts with some initial format information about records in that data source. In some circumstances, the record structure of the data source may not be known initially and may instead be determined after analysis of the data source. The initial information about records can include the number of bits that represent a distinct value, the order of fields within a record, and the type of value (e.g., string, signed/unsigned integer) represented by the bits.

The development environment 118 provides an interface used by a developer 120 for constructing and/or editing dataflow graphs to be executed in the execution environment 104. The dataflow graph is associated with executable data structures stored in the data storage system 116, and is represented in the development environment 118 as a directed graph that includes nodes and links connecting the nodes. The development environment is capable of accessing the data structures corresponding to the dataflow graph being developed. The nodes of the dataflow graph represent data sources, data sinks, and data processing components. The links represent a flow of data between the nodes. The development environment 118 is also capable of providing access to the catalog 114 of data set objects. The catalog 114 may be located in a data store in the data storage system 116 or in another data store.

The catalog 114 contains one or more data set objects that can be selected based on user input. A data set object is a dataflow graph node that includes multiple modes (called "personalities") that determine the functionality that the data set object will provide. For example, a data set object may include a data source personality and a data sink personality. When a data set object is selected for use as a node in a dataflow graph, the data set object adopts one of the personalities, for example based on user input. For example, the development environment 118 may include a graphical user interface (GUI) that includes a representation of the catalog and a canvas that includes a representation of the dataflow graph (e.g., nodes connected by links). A user (e.g., developer 120) can drag and drop a data set object from the catalog onto the canvas. Once a representation of the data set object is placed on the canvas, the user can select a personality for the data set object.

The selected personality is used to generate a new node in the dataflow graph. The selected personality is associated with transformational logic that alters data in some way. For example, a data source personality can include transformational logic that reads data records from a data store (e.g., a database table, file, or other data store) and performs some transformation. A data sink personality can include transformational logic that writes data records to the data store after performing some transformation. In some implementations, the transformation logic of a personality of a data set object can be implemented using a dataflow graph. In some implementations, each personality of the data set object is associated with a different respective dataflow graph, including nodes and links connecting the nodes.

Each personality can have input ports (for example, a data sink personality), output ports (for example, a data source personality), both input ports and output ports (for example, a data transformation personality) or no ports at all (for example, a lookup table personality). The new node generated by receiving a selection of a personality for a data set object reflects the transformational logic and the ports of the selected personality. In some implementations, the data set object identifies a location of a data source. The data set object may include a parameter that identifies the location of the data source. In some implementations, the parameter identifies the location of the data source using dynamic parameters that include values determined during the execution of the dataflow graph. The data set objects that access data sources can identify the format of the data and whether data is compressed or encrypted.

The generated node can be incorporated into the dataflow graph by connecting the generated node to at least one node in the dataflow graph using a link. In some implementations, the generated node provides data from the data source to the dataflow graph or stores data from the dataflow graph into the data store.

Figure 2A:
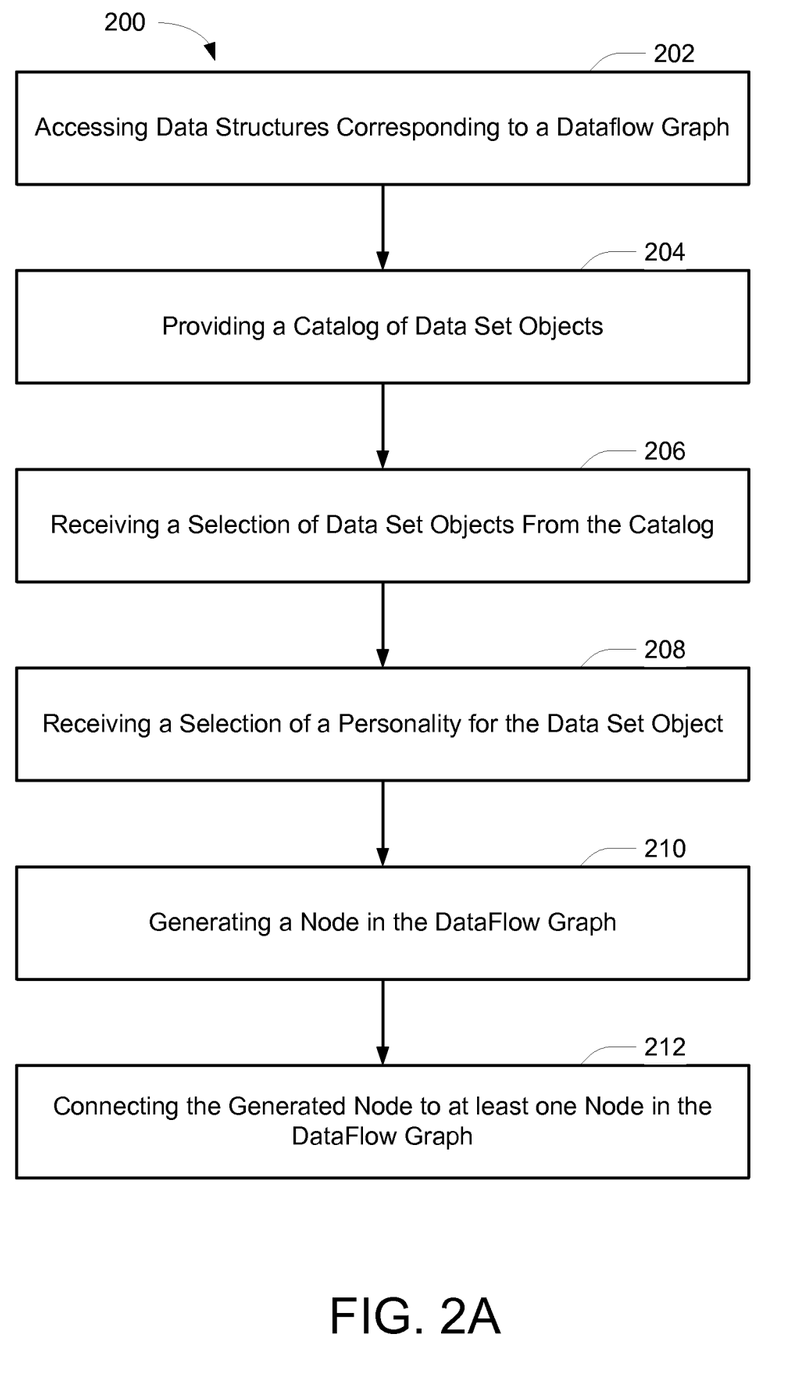
FIGS. 2A and 2B show flowcharts for an exemplary procedure 200 that can be used to manage data set objects.

FIG. 2A shows a flowchart of an exemplary process 200 that can be implemented by a system for managing data set objects. For convenience the process will be described in relation to a system performing the process.

The process 200 accesses 202 data structures corresponding to a dataflow graph. The data structures include nodes and links connecting the nodes where the links represent a flow of data between the nodes.

The process 200 provides 204 a catalog of data set objects. As described above, the catalog can contain one or more data set objects.

The process 200 receives 206 a selection of data set objects from the catalog. For example, a user can select a data set object from the data catalog by dragging the data set object from the catalog onto a canvas. As discussed above, the data set object includes multiple personalities, each personality includes transformational logic and at least one input port and/or at least one output port.

The process 200 receives 208 a selection of a personality for the data set object. As discussed above, a user can select a personality of the selected data set object, for example, by selecting a value on a radio button or a drop down menu.

The process 200 generates 210 a node in the dataflow graph. The generated node includes the transformational logic and any input and output ports of the selected personality.

The process 200 connects 212 the generated node to at least one node in the dataflow.

Figure 2B:
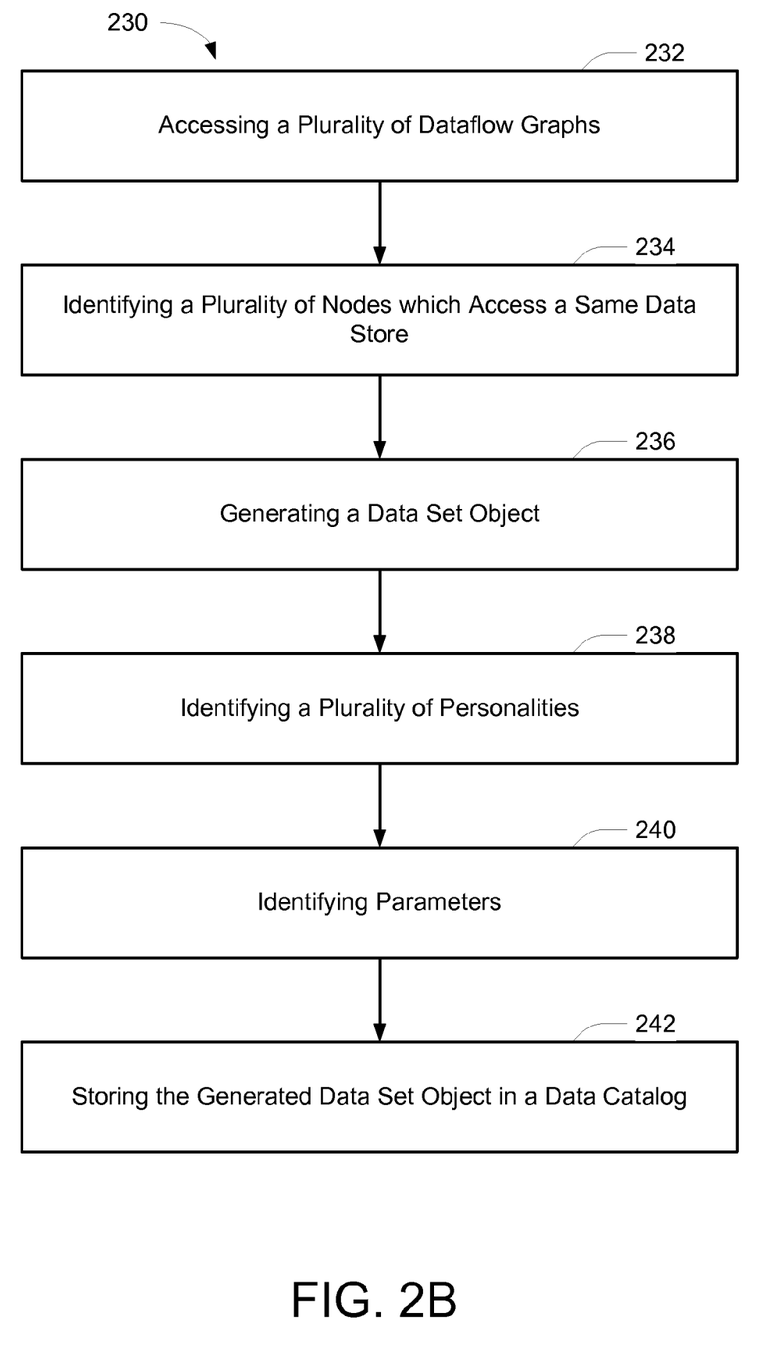

FIG. 2B shows a flowchart of an exemplary process 230 that can be implemented by a system for managing data set objects. For convenience the process will be described in relation to a system performing the process.

The process 230 accesses (232) a plurality of dataflow graphs. As discussed above, each dataflow graph includes nodes and links connecting the nodes. The nodes include transformational logic and the links represent a flow of data between the nodes.

The process 230 identifies 234 a plurality of nodes that access the same data store. Each of the nodes includes parameters and transformational logic.

The process 230 generates 236 a data set object. To generate the data set object the process identifies 238 a plurality of personalities based on the transformational logic of the plurality of nodes. The process 230 also identifies 240 parameters based on the parameters associated with the nodes. The process 230 stores 242 the generated data set object in a data catalog.

Figure 3:
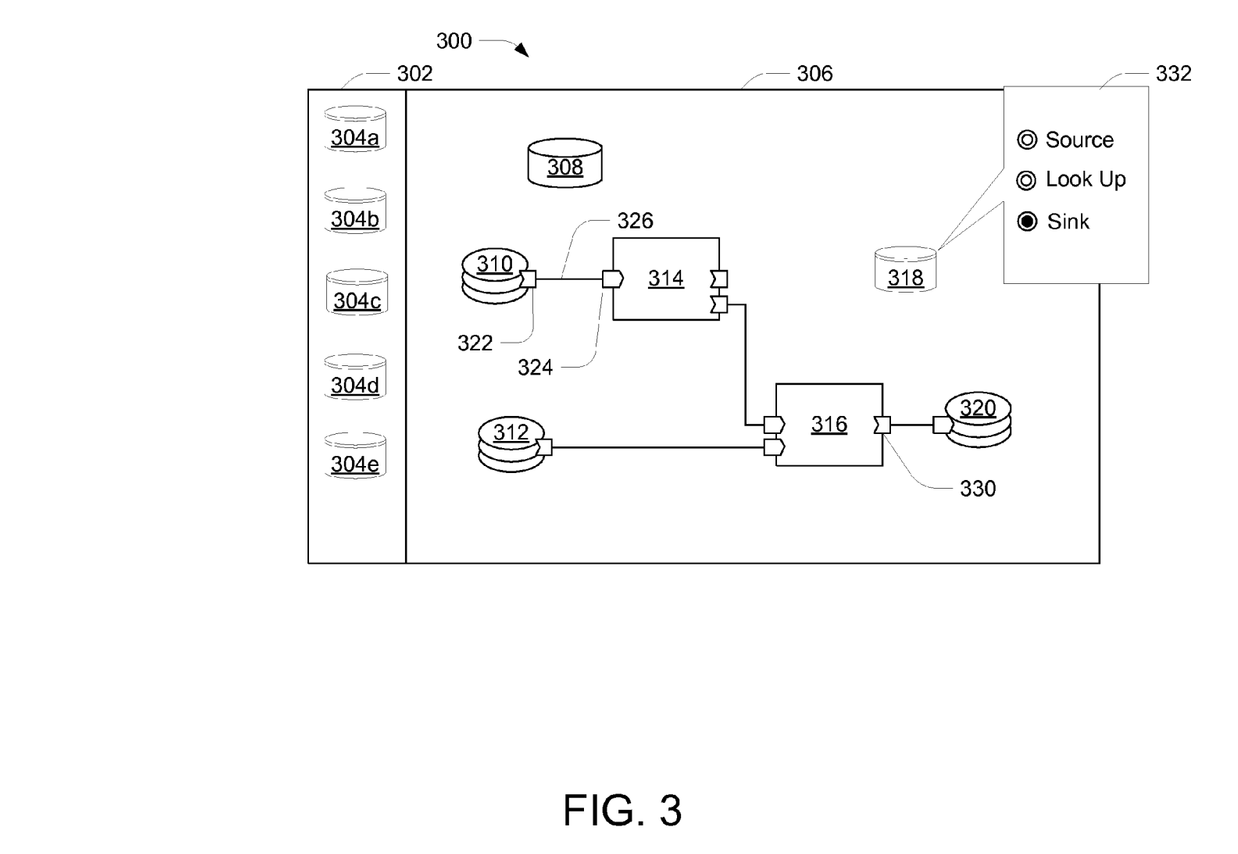
FIG. 3 illustrates an example user interface of the development environment.

FIG. 3 illustrates an example user interface 300 of a development environment, for example, the development environment 118 of FIG. 1. The user interface 300 includes a catalog 302 of data set objects that includes multiple data set objects 304*a-e*. The user interface 300 also includes a canvas 306 in which a user can create or modify a dataflow graph. The canvas displays representations of the nodes included in the dataflow graph. In this example, the dataflow graph includes a first data source 310, a second data source 312, a first component node 314, a second component node 316, a data sink 320, and a lookup table 308. The flow of data through the dataflow graph is defined by the links. For example the first data source 310 includes an output port 322, which is connected to the input port 324 of the component node 314 by a link 326.

A user (not shown) drags a data set object (e.g., data set object 304*b*) from the catalog 302 to the canvas 306 to generate a new node 318. The user selects a personality for the new node 318, for example, by selecting a personality using radio buttons on a properties interface element 332. Once a personality is selected the new node 318 will present the input ports, output ports, and/or transformational logic associated with the personality. As discussed below, the new object may also include parameters, which may be set by the user.

Figure 4:
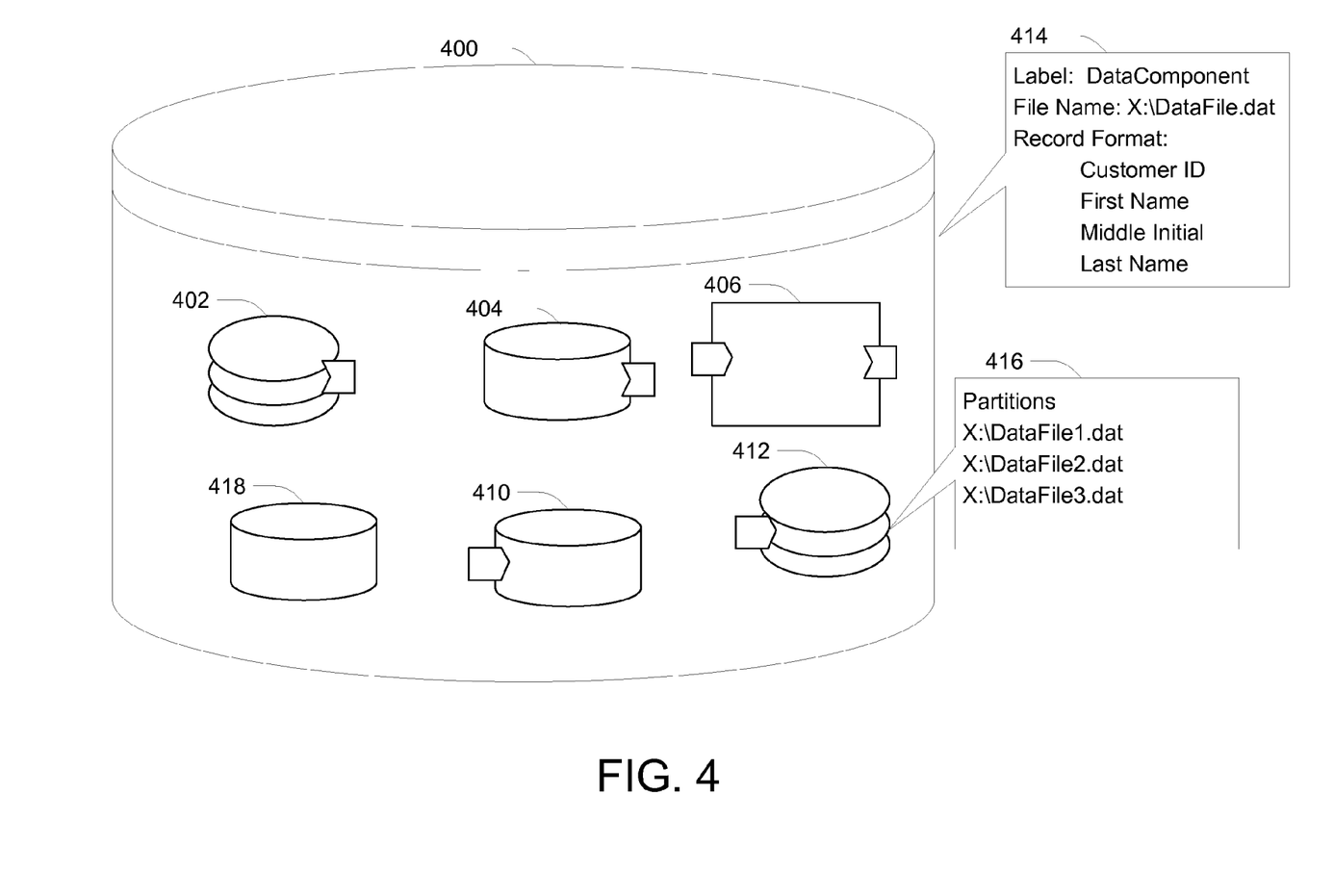
FIG. 4 illustrates exemplary personalities associated with a data set object.

FIG. 4 illustrates exemplary personalities associated with a data set object. A data set object 400 can be associated with one or more parameters 414. For example, the data set object 400 can be associated with parameters with values that define a label, a file name, a record format, a database table name, or any other information. In some implementations, the parameter values can be dynamically determined at run time.

The data set object 400 can include multiple personalities, each personality with its own characteristics including its own input ports, output ports, and/or transformational logic. For example, the data set object can include a data source personality 404 that reads data from a file, database table, or other data structure and provides it to the dataflow graph. The data set object 400 can also include a data sink personality 410, which accepts a flow of data records on an input port and stores them in a data store, for example, a database table, a file, or some other data store. The data set object 400 can include a parallel data source personality 402, which reads data from multiple parallel data structures and provides them to the dataflow graph. Similarly the data set object 400 can include a parallel data sink personality 412 that divided a stream of data records into multiple data stores.

The data set object 400 can include a lookup table personality 418. In general, a lookup table includes no input ports or output ports. The lookup table personality reads the data source into memory for rapid data lookups in other nodes.

The data set object 400 can include one or more component personalities, for example, the personality 406. In general, a component personality may include at least one input port and at least one output port and performs an operation on a dataflow. For example, a component may filter the dataflow to identify data records having particular values.

In some implementations, parameters can be associated with a data set object personality. For example, the parallel data sink personality 412 is associated with parameters 416 that define the names of the files to which the dataflow is to be partitioned.

In some scenarios, the data set object can include multiple data sinks and sources. For example, a data set object can include a first data sink personality that writes data to a database table, a second data sink personality that writes data to a flat file, and a third data sink personality that writes data to a remote server using the file transfer protocol (FTP). Similarly, a data set object can include a first data source personality that reads data from a database table, a second data source personality that reads data from a flat file, and a third data source personality that accesses data on a remote server using FTP. In some implementations, other protocols and data access methods can be used (e.g., the Hyper Text Transport Protocol (HTTP) and Extensible Markup Language (XML) documents). In some implementations, all data source personalities for a data set object produce identical outputs and all data sink personalities for a data set object accept identical inputs. Therefore, which data source personality or data sink personality is included in a dataflow graph may be transparent to the other nodes in the dataflow graph.

As discussed above, in some implementations, a data set personality can be associated with transformational logic implemented as a dataflow graph that performs transformations on data. For example, a data source personality of a data set object may read an XML file and transform the hierarchical XML data into a series of sequential records for processing. Similarly, a data sink personality of a data set object may accept a series of sequential records and transform the records into hierarchical XML data to be stored in an XML file.

Other personalities that may be associated with a data set object include personalities that refresh data from a data source and personalities that update records in a data source.

Figure 5:
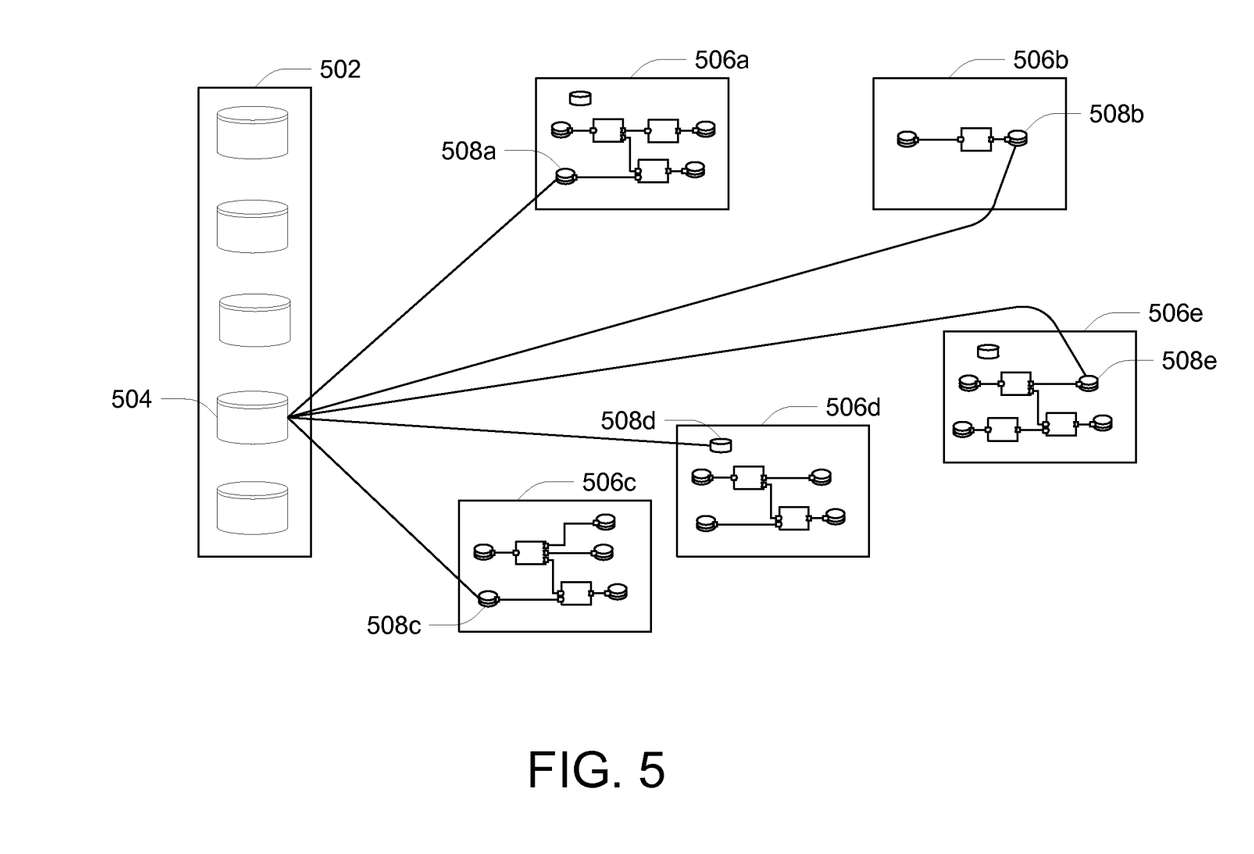
FIG. 5 illustrates relationships between dataflow graphs and the data set objects in a catalog.

FIG. 5 illustrates relationships between dataflow graphs and the data set objects in a catalog. When a data set object from the catalog is used to generate a node in a dataflow graph the relationship between the component and the data set object is maintained. In this example, data set object 504 was used to generate node 508a in dataflow graph 506a. Similarly the same data set object 504 was used to generate nodes 508b-e in dataflow graphs 505b-e.

Represented by line 510a, the catalog 502 maintains the relationship between the data set object 504 and the node 508a. As represented by lines 510b-e, the relationships between the data set object 504 and the nodes 508b-e are similarly maintained, as represented by lines 510b-e. In some implementations, the nodes 508a-e maintain the identity of the data set object 504 that was used to generate the node.

In some implementations, the dataflow graphs 506a-e implements the nodes 508a-e by referring to the data set object 504. In this implementation, changes made to the personalities of the data set object 504 are automatically reflected in the executing dataflow graphs 506a-e.

A user of a development environment, for example the development environment 118 of FIG. 1, can use the maintained relationships to analyze dependencies between dataflow graphs. For example, the user can identify each of the dataflow graphs 506a-e that will be affected by changes to the data set object 504 or a data source identified by the data set object. The identified dataflow graphs can be modified as necessary to accommodate the changes.

Figure 6:
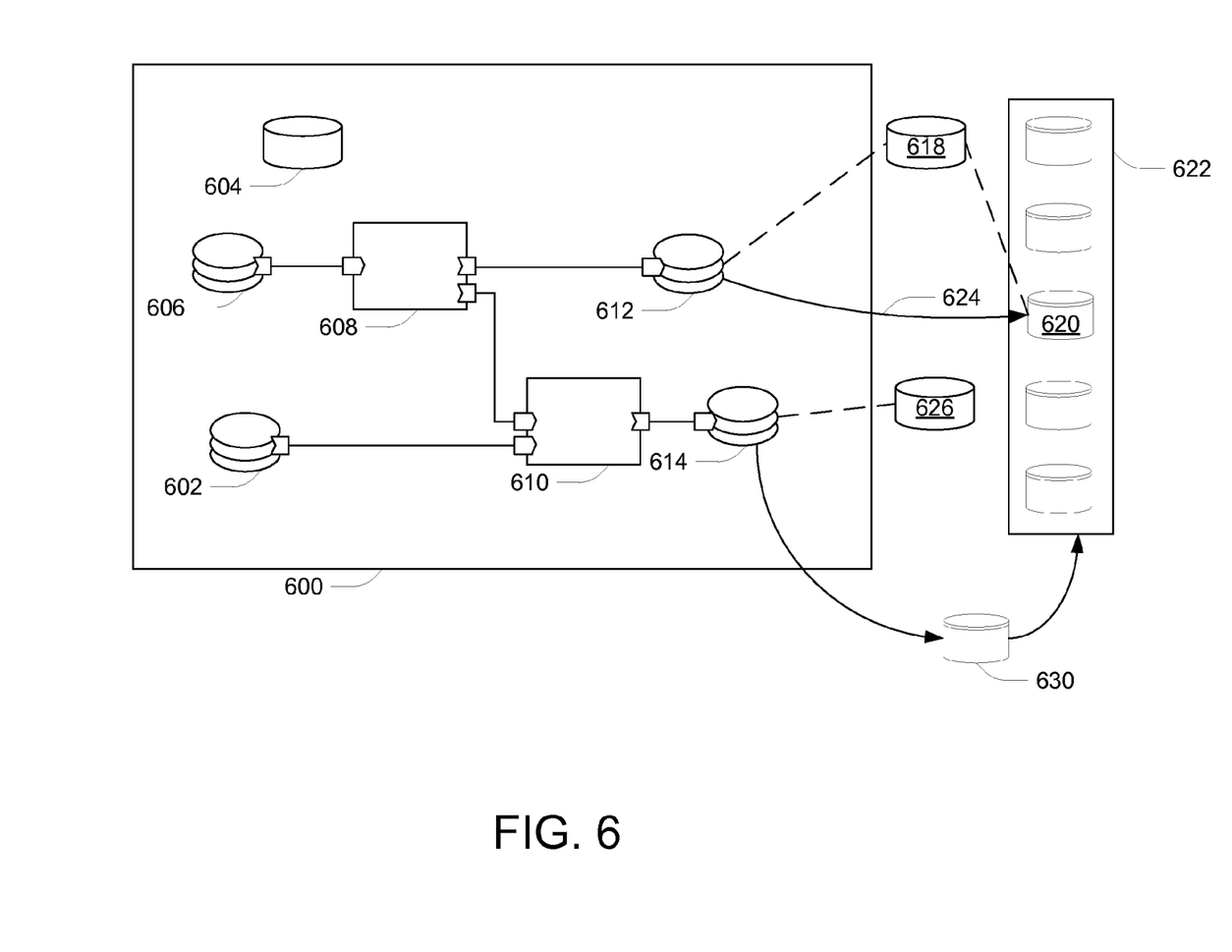
FIG. 6 illustrates associating existing nodes with a data set object in a catalog.

FIG. 6 illustrates associating existing nodes with a data set object in a catalog. In some scenarios, a user may have generated nodes (e.g., a data source, a data sink, or a lookup table) that accesses a data store without using a data set object from the catalog. This may occur because an appropriate data set object did not exist at the time of the creation of the dataflow graph, or simply because the developer neglected to use one provided. Referring to FIG. 1, the development environment 118 in conjunction with the data storage system 116 and, potentially, the execution environment 104 can identify these nodes and associate them with an appropriate data set object, as described below.

Referring again to FIG. 6, a data sink 612 is a sink for a data store 618, and includes transformational logic for accessing the data store 618. The development environment determines that a data set object 620 in the catalog includes a data sink personality (not shown) that is also a sink for the data store 618. Represented by arrow 624, the data sink 612 is associated with the data set object 620. In some implementations, the transformational logic in the data sink 612 is replaced with transformational logic in the data sink personality of the data set object 620. In other implementations, the transformational logic is not replaced. In some scenarios, the data sink 612 may be added to the data set object 620 as a distinct personality (for example, if the data set object 620 does not include a data sink personality).

In another scenario, a data sink 614 is a sink for the data store 626, and includes transformational logic for accessing the data store 626. The development environment determines that no data set object exists in the catalog 622 that corresponds to the data sink 614. Consequently, the development environment creates a new data set object 630 with a data sink personality (not shown) based on the data sink 614. The new data set object 630 is added to the catalog 622. The new data set object 630 is associated with the data sink 614.

In some implementations, the development environment can associate a node (data source, data sink, lookup table, or other component) based on the value of the parameters of the node. For example, if the parameters and the parameter values of the data set object match the parameters and the parameter values of the node, then the node can be associated with the data set object. In some implementations, nodes and data set objects may be associated even if the parameters and parameter values are not an exact match. For example, some parameters may be deemed required parameters (e.g., both the parameter and the value of the parameter must match before a node and the dataset object can be associated). Other parameters may be deemed optional parameters that do not have to be present or match the parameter value of the data set object for the node to be associated with the dataset object.

As discussed above, some parameters can have values that are not determined until the graph is executed. In this scenario, the system can track the values of the parameters for the nodes of the dataflow graph during execution. The parameters and their values determined during execution can be compared to the parameters and their values of the data set object, as discussed above.

Figure 7:
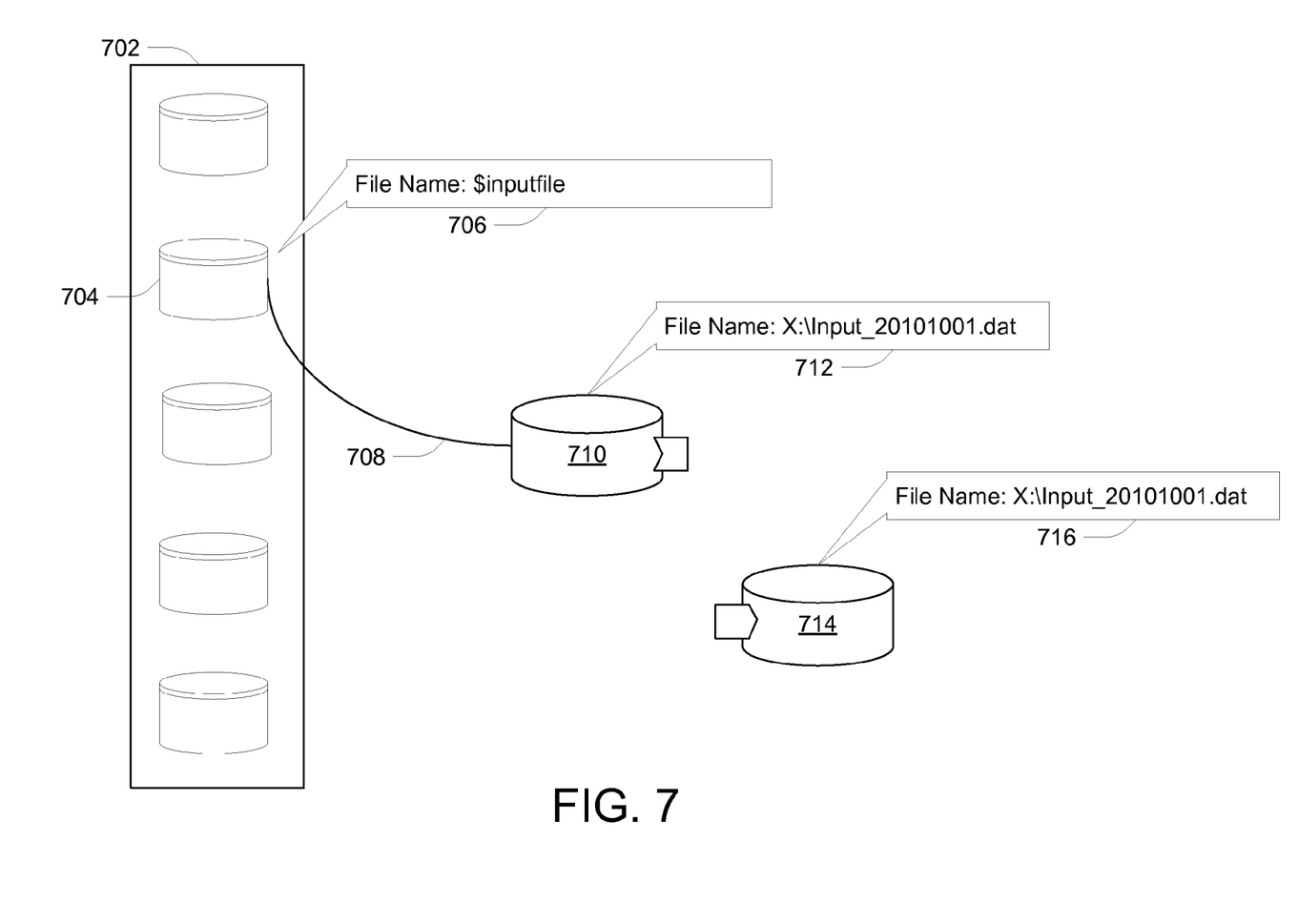
FIG. 7 illustrates associating a node with a data set object based on parameter values.

Referring to FIG. 7, in some implementations, parameters and their values determined during execution are compared to the parameters and their values of other nodes associated with data set objects during execution. For example, a data catalog 702 includes a data set object 704 with a parameter 706 "FileName" with a value "$inputfile", where "$inputfile" indicates that the parameter 706 is a dynamic parameter whose value is determined during execution. As represented by the connecting line 708, the data set object 704 is associated with a data source 710, which was previously generated as a data source personality of the data set object 704. During execution, the value of the parameter 712 "FileName" is determined to be "X:\Input_20101001.dat." A data sink 714 not associated with the data set object 704 includes a parameter 716 "FileName" with a value of "X:\Input_20101001.dat." Based on the matching parameters 706 and 716, and the value of parameter 716 matching with the value of another parameter 712 already associated with the data set object 704, the data sink 714 is determined to be associated with the data set object 704, as a data sink personality of the data set object 704. Generally, matching a node (data source, data sink, or lookup table) to a data set object may require matching multiple parameters and their values. For example, associating a node to a data set object may require matching parameters identifying a location of a data store and a record format.

The data set object approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for managing data set objects for use in connection with a dataflow graph processing data in a data processing system, the method including:

storing a group of one or more data set objects in a data storage system, each data set object in the group representing a respective data set, the group including a first data set object representing a first data set, the first data set object having a plurality of modes, each of the plurality of modes corresponding to respective transformational logic, the plurality of modes including at least:

a first mode for reading data records from the first data set, the first mode being associated with first transformational logic to be applied to data records read from the first data set, and a second mode for writing data records to the first data set, the second mode being associated with second transformational logic to be applied to data records before they are written to the first data set, wherein the first transformational logic is different from the second transformational logic;

accessing information specifying the dataflow graph, the dataflow graph comprising a plurality of nodes and a plurality of links connecting the plurality of nodes, the plurality of links representing flows of data among nodes in the plurality of nodes;

identifying the first data set object from the group of one or more data set objects;

identifying a mode from the plurality of modes for the first data set object;

adding, based on the accessed information specifying the dataflow graph, a first node to the plurality of nodes of the dataflow graph; and generating an association between the first data set object and the first node of the dataflow graph such that data processed by the first node is processed in accordance with transformational logic associated with the identified mode.

2. The method of claim 1, wherein generating the association between the first data set object and the first node includes:

connecting the first node to at least one other node in the dataflow graph using a link.

3. The method of claim 1, wherein one of the plurality of modes of the first data set object is represented by a second dataflow graph different from the dataflow graph.

4. The method of claim 1, wherein the plurality of modes for the first data set object includes multiple modes for reading data records to the dataset, the multiple modes including the first mode, wherein each of the multiple modes is associated with respective transformational logic to be applied to data records read from the first data set.

5. The method of claim 1, wherein the plurality of modes for the first data set object includes multiple modes for writing data records to the dataset, the multiple modes including the second mode, wherein each of the multiple modes is associated with respective transformational logic to be applied to data records before they are written to the first data set.

6. The method of claim 1, wherein data records in the first data set are stored in an XML format and the first transformational logic, when executed, transforms the data records from the XML format into a series of sequential data records.

7. The method of claim 1, wherein the second transformational logic, when executed, transforms a series of sequential data records into an XML format.

8. The method of claim 1, wherein identifying the mode from the plurality of modes is performed based on user input provided via a graphical user interface, the user input indicating a selection of the mode.

9. The method of claim 1, wherein identifying the first data set object comprises:

receiving, in a graphical user interface displaying a catalog of data set objects in the group and a canvas, first user input indicating a selection of the first data set object and its placement at a location on the canvas.

10. A non-transitory computer-readable storage medium storing a computer program, that when executed by at least one processor, causes the at least one processor to perform a method for managing data set objects for use in connection with a dataflow graph processing data in a data processing system, the method comprising:

storing a group of one or more data set objects in a data storage system, each data set object in the group representing a respective data set, the group including a first data set object representing a first data set, the first data set object having a plurality of modes, each of the plurality of modes corresponding to respective transformational logic, the plurality of modes including at least:

a first mode for reading data records from the first data set, the first mode being associated with first transformational logic to be applied to data records read from the first data set, and a second mode for writing data records to the first data set, the second mode being associated with second transformational logic to be applied to data records before they are written to the first data set, wherein the first transformational logic is different from the second transformational logic;

accessing information specifying the dataflow graph, the dataflow graph comprising a plurality of nodes and a plurality of links connecting the plurality of nodes, the plurality of links representing flows of data among nodes in the plurality of nodes;

identifying the first data set object from the group of one or more data set objects;

identifying a mode from the plurality of modes for the first data set object;

adding, based on the accessed information specifying the dataflow graph, a first node to the plurality of nodes of the dataflow graph; and generating an association between the first data set object and the first node of the dataflow graph such that data processed by the first node is processed in accordance with transformational logic associated with the identified mode.

11. The non-transitory computer-readable storage medium of claim 10, wherein the plurality of modes for the first data set object includes multiple modes for reading data records to the dataset, the multiple modes including the first mode, wherein each of the multiple modes is associated with respective transformational logic to be applied to data records read from the first data set.

12. The non-transitory computer-readable storage medium of claim 10, wherein the plurality of modes for the first data set object includes multiple modes for writing data records to the dataset, the multiple modes including the second mode, wherein each of the multiple modes is associated with respective transformational logic to be applied to data records before they are written to the first data set.

13. The non-transitory computer-readable storage medium of claim 10, wherein data records in the first data set are stored in an XML format and the first transformational logic, when executed, transforms the data records from the XML format into a series of sequential data records.

14. The non-transitory computer-readable storage medium of claim 10, wherein identifying the mode from the plurality of modes is performed based on user input provided via a graphical user interface, the user input indicating a selection of the mode.

15. The non-transitory computer-readable storage medium of claim 10, wherein identifying the first data set object comprises:

receiving, in a graphical user interface displaying a catalog of data set objects in the group and a canvas, first user input indicating a selection of the first data set object and its placement at a location on the canvas.

16. A computing system for managing data set objects for use in connection with a dataflow graph processing data in a data processing system, the computing system including:

a data storage system storing a group of one or more data set objects in a data storage system, each data set object in the group representing a respective data set, the group including a first data set object representing a first data set, the first data set object having a plurality of modes, each of the plurality of modes corresponding to respective transformational logic, the plurality of modes including at least:

a first mode for reading data records from the first data set, the first mode being associated with first transformational logic to be applied to data records read from the first data set, and a second mode for writing data records to the first data set, the second mode being associated with second transformational logic to be applied to data records before they are written to the first data set, wherein the first transformational logic is different from the second transformational logic; and at least one processor coupled to the data storage system and configured to perform:

accessing information specifying the dataflow graph, the dataflow graph comprising a plurality of nodes and a plurality of links connecting the plurality of nodes, the plurality of links representing flows of data among nodes in the plurality of nodes;

identifying the first data set object from the group of one or more data set objects;

identifying a mode from the plurality of modes for the first data set object;

adding, based on the accessed information specifying the dataflow graph, a first node to the plurality of nodes of the dataflow graph; and generating an association between the first data set object and the first node of the dataflow graph such that data processed by the first node is processed in accordance with transformational logic associated with the identified mode.

17. The computing system of claim 16, wherein the plurality of modes for the first data set object includes multiple modes for reading data records to the dataset, the multiple modes including the first mode, wherein each of the multiple modes is associated with respective transformational logic to be applied to data records read from the first data set.

18. The computing system of claim 16, wherein the plurality of modes for the first data set object includes multiple modes for writing data records to the dataset, the multiple modes including the second mode, wherein each of the multiple modes is associated with respective transformational logic to be applied to data records before they are written to the first data set.

19. The computing system of claim 16, wherein data records in the first data set are stored in an XML format and the first transformational logic, when executed, transforms the data records from the XML format into a series of sequential data records.

20. The computing system of claim 16, wherein the second transformational logic, when executed, transforms a series of sequential data records into an XML format.

21. The computing system of claim 16, wherein identifying the mode from the plurality of modes is performed based on user input provided via a graphical user interface, the user input indicating a selection of the mode.

22. The computing system of claim 16, wherein identifying the first data set object comprises:

receiving, in a graphical user interface displaying a catalog of data set objects in the group and a canvas, first user input indicating a selection of the first data set object and its placement at a location on the canvas.

23. A computing system for managing data set objects for use in connection with a dataflow graph processing data in a data processing system, the computing system including:

means for storing a group of one or more data set objects in a data storage system, each data set object in the group representing a respective data set, the group including a first data set object representing a first data set, the first data set object having a plurality of modes, each of the plurality of modes corresponding to respective transformational logic, the plurality of modes including at least:

a first mode for reading data records from the first data set, the first mode being associated with first transformational logic to be applied to data records read from the first data set, and a second mode for writing data records to the first data set, the second mode being associated with second transformational logic to be applied to data records before they are written to the first data set, wherein the first transformational logic is different from the second transformational logic;

means for accessing information specifying the dataflow graph, the dataflow graph comprising a plurality of nodes and a plurality of links connecting the plurality of nodes, the plurality of links representing flows of data among nodes in the plurality of nodes;

means for identifying the first data set object from the group of one or more data set objects;

means for identifying a mode from the plurality of modes for the first data set object;

adding, based on the accessed information specifying the dataflow graph, a first node to the plurality of nodes of the dataflow graph; and means for generating an association between the first data set object and the first node of the dataflow graph such that data processed by the first node is processed in accordance with transformational logic associated with the identified mode.

* * * * *